United States Patent
Sane et al.

(10) Patent No.: US 9,826,455 B2
(45) Date of Patent: *Nov. 21, 2017

(54) NETWORK RESELECTION BY A WIRELESS COMMUNICATION DEVICE BASED ON SIGNAL-TO-NOISE RATIO

(71) Applicant: Apple Inc., Cupertino, CA (US)

(72) Inventors: Sachin J. Sane, Fremont, CA (US); Sai Sravan Bharadwaj Karri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/636,051

(22) Filed: Mar. 2, 2015

(65) Prior Publication Data

US 2015/0181497 A1    Jun. 25, 2015

Related U.S. Application Data

(63) Continuation of application No. 13/923,604, filed on Jun. 21, 2013, now Pat. No. 8,971,894.

(60) Provisional application No. 61/663,492, filed on Jun. 22, 2012.

(51) Int. Cl.
*H04L 1/00* (2006.01)
*H04W 36/30* (2009.01)
*H04W 36/12* (2009.01)
*H04W 36/14* (2009.01)

(52) U.S. Cl.
CPC .......... *H04W 36/30* (2013.01); *H04W 36/12* (2013.01); *H04W 36/14* (2013.01)

(58) Field of Classification Search
CPC ............ H04B 7/18528; H04B 7/18571; H04B 7/18576; H04B 7/18541; H04B 7/2615; H04W 84/06; H04W 36/00; H04W 36/0005; H04W 36/0016; H04L 47/767; H04L 5/26; H04J 4/00
USPC .......... 370/329–333; 455/436, 437, 439, 331
See application file for complete search history.

(56) References Cited

U.S. PATENT DOCUMENTS

| | | |
|---|---|---|
| 6,845,238 B1 | 1/2005 | Muller |
| 7,257,421 B2 | 8/2007 | Vasudevan et al. |
| 7,860,502 B2 | 12/2010 | Kim et al. |
| 2008/0280615 A1 | 11/2008 | Vinayakray-Jani |
| 2009/0073936 A1 | 3/2009 | Jentz et al. |

(Continued)

FOREIGN PATENT DOCUMENTS

| | | |
|---|---|---|
| WO | 2006065423 | 6/2006 |
| WO | 2012037670 | 3/2012 |

*Primary Examiner* — Dady Chery
(74) *Attorney, Agent, or Firm* — Downey Brand LLP

(57) ABSTRACT

A method for network reselection by a wireless communication device is provided. The wireless communication device can have an established connection to a first network. The method can include measuring a signal strength and a signal-to-noise ratio of the first network. The method can further include determining that the signal strength satisfies a signal strength threshold. The method can additionally include comparing the signal-to-noise ratio to a signal-to-noise ratio threshold. The method can also include disconnecting from the first network and reselecting to a second network in an instance in which the signal-to-noise ratio does not satisfy the signal-to-noise ratio threshold even though the signal strength satisfies the signal strength threshold.

20 Claims, 8 Drawing Sheets

(56) References Cited

U.S. PATENT DOCUMENTS

| | | |
|---|---|---|
| 2012/0015649 A1 | 1/2012 | Li et al. |
| 2012/0015653 A1 | 1/2012 | Paliwal et al. |
| 2012/0106346 A1 | 5/2012 | Aguirre et al. |
| 2012/0147764 A1 | 6/2012 | Wang et al. |
| 2012/0270538 A1 | 10/2012 | Meylan et al. |
| 2013/0244673 A1* | 9/2013 | Anand .................. H04W 24/02 455/450 |
| 2014/0080491 A1 | 3/2014 | Tinnakornsrisuphap et al. |
| 2014/0247733 A1 | 9/2014 | Yang et al. |

* cited by examiner

NETWORK RESELECTION BY A WIRELESS COMMUNICATION DEVICE BASED ON SIGNAL-TO-NOISE RATIO

CROSS-REFERENCE TO RELATED APPLICATIONS

This application is a continuation of U.S. patent application Ser. No. 13/923,604 filed on Jun. 21, 2013, which claims the benefit of U.S. Provisional Patent Application No. 61/663,492, filed on Jun. 22, 2012, which are incorporated by reference herein in their entirety for all purposes.

FIELD

The described embodiments relate generally to wireless communications and more particularly to network reselection by a wireless communication device based on signal-to-noise ratio.

BACKGROUND

Wireless cellular networks using newer radio access technology (RAT) systems, such as Long Term Evolution (LTE) (including LTE-Advanced) systems, are being developed and deployed. Networks using these newer RATs often support faster theoretical data rates than networks utilizing legacy RATs, such as second generation (2G) and third generation (3G) RATs, including Universal Mobile Telecommunications System (UMTS) networks and Global System for Mobile Communications (GSM) networks. In some deployments, however, LTE and other new RATs may not fully support some services that can be handled by legacy networks. Accordingly, LTE networks and other wireless cellular networks that use newer RAT technology are often co-deployed in overlapping regions with legacy networks, and wireless communication devices may transition between using different RATs as services or coverage may require. For example, in some deployments, some LTE networks are not capable of supporting voice connections. Accordingly, when a wireless communication device receives or initiates a voice connection while connected to a network that supports data sessions, but not voice connections, the wireless communication device can perform a circuit switched fallback (CSFB) procedure to transition to a legacy network that supports voice connections. After completion of a voice connection, the wireless communication device can transition back to the LTE network to enjoy faster data rates.

In some instances, a wireless communication device can reselect from an LTE network to a legacy network even if a voice connection is not initiated. For example, a signal strength (e.g., a measure of a received signal power) of the LTE network at the wireless communication device can degrade to a level below a network-configured reselection threshold, and the wireless communication device can reselect to a legacy network offering a better signal strength. In some circumstances, however, signal strength alone may not suffice to determine whether channel quality can adequately support communication with a particular wireless communication device or for particular wireless services, and a wireless communication device can remain on an LTE network even in situations in which it is desirable to reselect to a legacy network. In this regard, while a measured signal strength of a signal from a serving LTE base station can indicate sufficient signal power for satisfactory communication, additional signals emitted by other neighboring LTE cells, by proximate wireless communication devices, and/or by base stations of neighboring legacy networks can result in significant signaling interference at a wireless communication device, particularly at an edge of an LTE cell. The increased interference can negatively impact signal quality at the wireless communication device and can impede clear reception of signaling messages from the serving LTE network, even in instances in which the serving LTE network's signal strength satisfies a signal strength threshold.

SUMMARY

Some embodiments disclosed herein provide for network reselection by a wireless communication device based on signal-to-noise ratio. In this regard, a wireless communication device in accordance with some example embodiments can be configured to measure a signal-to-noise ratio of a first network to which the wireless communication device can have an established connection. The wireless communication device of such example embodiments can be configured to compare the measured signal-to-noise ratio to a signal-to-noise ratio threshold, and can reselect to a second network in an instance in which the measured signal-to-noise ratio does not satisfy a signal-to-noise ratio threshold, even in instances in which a measured signal strength of the first network satisfies a signal strength threshold. Accordingly, reselection to a second network can be performed in areas with relatively high amounts of interference, even if a measured signal strength satisfies a network configured threshold. As such, some example embodiments can improve reception of data by a wireless communication device by enabling reselection in interference conditions on the basis of a signal-to-noise ratio threshold. In this regard, by preemptively reselecting to a different network based on signal-to-noise ratio, a wireless communication device can increase the likelihood that incoming data, such as a signaling message, e.g., for a voice connection, is received and decoded successfully.

In a first embodiment, a method for network reselection by a wireless communication device is provided. The method of the first embodiment can include measuring a signal strength and a signal-to-noise ratio of a first network. The wireless communication device can have an established connection to the first network. The method of the first embodiment can further include determining that the signal strength satisfies a signal strength threshold; comparing the signal-to-noise ratio to a signal-to-noise ratio threshold; and disconnecting from the first network and reselecting to a second network when the signal-to-noise ratio does not satisfy the signal-to-noise ratio threshold and the signal strength satisfies the signal strength threshold.

In a second embodiment, a wireless communication device is provided. The wireless communication device of the second embodiment can include wireless circuitry and processing circuitry coupled to the wireless circuitry. The wireless circuitry can be configured to transmit data to and receive data from a first network and a second network. The processing circuitry can be configured to control the wireless communication device of the second embodiment to at least establish a connection to the first network; measure a signal strength and a signal-to-noise ratio of the first network; determine that the signal strength satisfies a signal strength threshold; compare the signal-to-noise ratio to a signal-to-noise ratio threshold; and disconnect from the first network and reselect to the second network when the signal-to-noise ratio does not satisfy the signal-to-noise ratio threshold and the signal strength satisfies the signal strength threshold.

In a third embodiment, a computer program product for facilitating network reselection by a wireless communication device is provided. The computer program product of the third embodiment can include at least one non-transitory computer readable storage medium having program code stored thereon. The program code of the third embodiment can include program code for measuring a signal strength of a first network. The wireless communication device can have an established connection to the first network. The program code of the third embodiment can further include program code for measuring a signal-to-noise ratio of the first network; program code for determining that the signal strength satisfies a signal strength threshold; program code for comparing the signal-to-noise ratio to a signal-to-noise ratio threshold; and program code for disconnecting from the first network and reselecting to a second network when the signal-to-noise ratio does not satisfy the signal-to-noise ratio threshold and the signal strength satisfies the signal strength threshold.

In a fourth embodiment, an apparatus is provided. The apparatus of the fourth embodiment can include means for measuring a signal strength and a signal-to-noise ratio of a first network. The apparatus can have an established connection to the first network. The apparatus of the fourth embodiment can further include means for determining that the signal strength satisfies a signal strength threshold; means for comparing the signal-to-noise ratio to a signal-to-noise ratio threshold; and means for disconnecting from the first network and reselecting to a second network when the signal-to-noise ratio does not satisfy the signal-to-noise ratio threshold and the signal strength satisfies the signal strength threshold.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

Representative applications of methods and apparatus according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein provide for network reselection by a wireless communication device based on signal-to-noise ratio. In this regard, some example embodiments provide for reselection from a first network to a second network in a mixed environment in which the wireless communication device can be operating in the presence of overlapping coverage from multiple networks, which can use different radio access technologies (RATs) such that the wireless communication device can reselect to a second network in response to a signal-to-noise ratio measured on the first network failing to satisfy a threshold level. Accordingly, reselection can be performed in situations in which interference conditions can impede reception of data, such as, by way of non-limiting example, incoming paging messages, by the wireless communication device on the first network.

Figure 1:
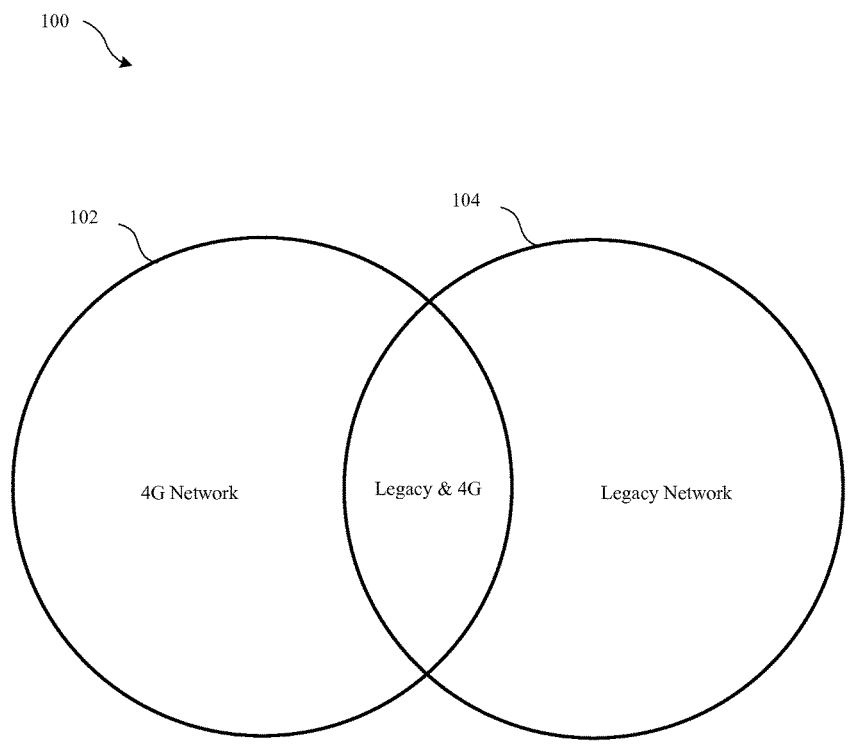
FIG. 1 illustrates overlapping coverage of a fourth generation (4G) network and a legacy network in accordance with some embodiments.

FIG. 1 illustrates overlapping coverage of a fourth generation (4G) network 102 and a legacy network 104 in a communications system 100 in accordance with some example embodiments. The 4G network 102 can, for example, be a network implementing an LTE wireless communication protocol in accordance with a Third Generation Partnership Project (3GPP) standard, such as an LTE network or an LTE-Advanced (LTE-A) network, or other network that can offer faster data rates than legacy networks, such as 2G and 3G networks, but may not support voice connections. It will be appreciated that the 4G network is illustrated by way of example, and not by way of limitation.

In this regard, other networks in existence now or that may be developed in the future that offer higher data rates but that do not support circuit switched (CS) voice connections can be substituted for the 4G network 102 within the scope of the disclosure. The legacy network 104 can be any legacy network having a Circuit switched domain to support CS voice connections. By way of non-limiting example, the legacy network 104 can be a 3G network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy network 104 can be a CDMA2000 network, such as a 1×RTT network, or other network standardized by the Third Generation Partnership Project 2 (3GPP2) that supports a Circuit switched domain. As another example, the legacy network can be a 2G network such as a Global System for Mobile Communications (GSM) network.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when a wireless communication device is in a region of overlapping coverage from both the 4G network 102 and the legacy network 104, the wireless communication device can establish a connection to either the 4G network 102 or the legacy network 104.

When a wireless communication device is camped on the 4G network 102, reselection to the legacy network 104 can be governed by a reference signal receive power (RSRP) level. A value for the RSRP level can provide information regarding an amount of signal strength received by the wireless communication device at a particular location. Using the RSRP value as a measure of signal strength, the 4G network 102 can set a threshold level to guide the wireless communication device when to leave the 4G network 102 and reselect to the legacy network 104. In some example embodiments, the 4G network 102 can set the threshold to a level at which a reselection process can be initiated at around −104 dBm. Alternatively, in some embodiments, the 4G network 102 can set the threshold to −110 dBm. If a measured RSRP value is less than the threshold, the 4G network 102 can signal the wireless communication device to leave the 4G network 102, and reselect to the legacy network 104. A mobile network operator can prefer to keep a wireless communication device on the 4G network 102, which can provide higher data rates, over a legacy network 104, and thus can set a threshold to a level at which reselection from the 4G network 102 to the legacy network 104 requires a low signal strength. Signal strength alone, however, may not adequately determine performance for a wireless communication device, as added noise and interference can affect the wireless communication device's ability to properly receive and decode messages, including critical signaling messages.

Figure 2:
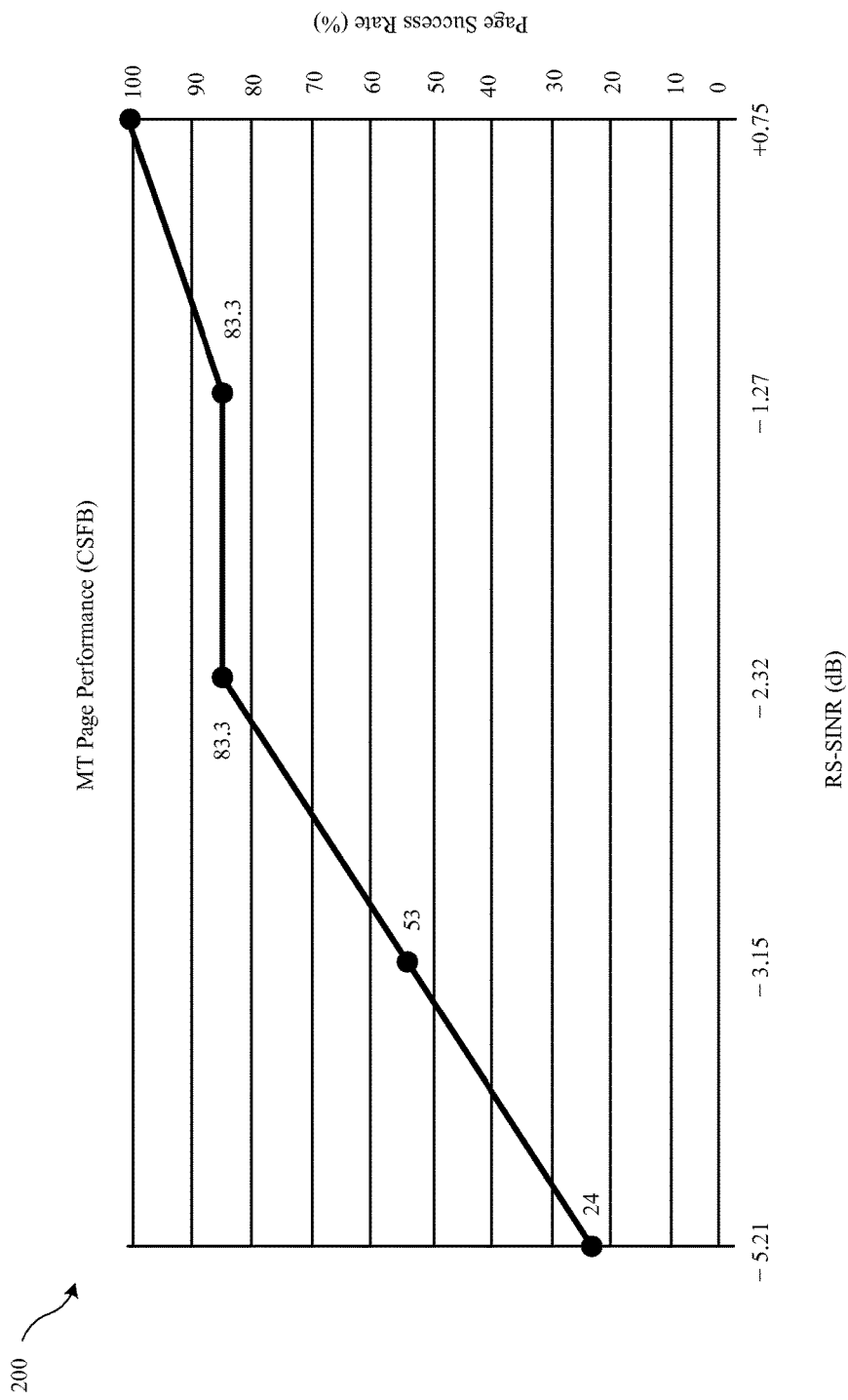
FIG. 2 is a graph illustrating a relationship between a measured signal-to-noise and interference ratio and a page success rate.

Making reselection decisions to switch from a 4G network 102 to a legacy network 104, or the reverse, determined solely on measurement of a received signal strength, e.g., the RSRP, can lead to poor operating conditions for a wireless communication device. Poor operating conditions at the wireless communication device can arise from interfering signals emitted by nearby wireless access points or other wireless devices that can operate in a frequency band overlapping, adjacent to, and/or near a current operating frequency band of the wireless communication device. FIG. 2 illustrates a graph 200 a measurement of a signal-to-noise ratio (more specifically, a reference signal signal-to-interference-and-noise ratio (RS-SINR)) on the X-axis and a page success rate on the Y-axis. A page is a signaling message sent by the network to the wireless communication device to provide information for control of connections between the wireless communication device and one or more networks. For example, a page can indicate a proposed connection, e.g., an incoming voice connection. In some instances, a page can be signaled to a wireless communication device camped on a 4G network to indicate the presence of an incoming CS voice connection for which the wireless communication device can be required to perform a CSFB procedure in order to transition from the 4G network to a legacy network for receiving the voice connection on a Circuit switched domain of the legacy network. As the graph 200 of FIG. 2 illustrates, as the level of interference increases (resulting in lower SINR) at the wireless communication device, the probability that the wireless communication device successfully receives a paging message decreases, which can result in the wireless communication device missing an incoming voice connection request. As the RS-SINR drops below a level of approximately 0 dB, the page performance success rate steadily decreases, e.g., at an RS-SINR less than 3 dB, the page success rate of the wireless communication device successfully decoding a paging message can be less than 50%.

Figure 3:
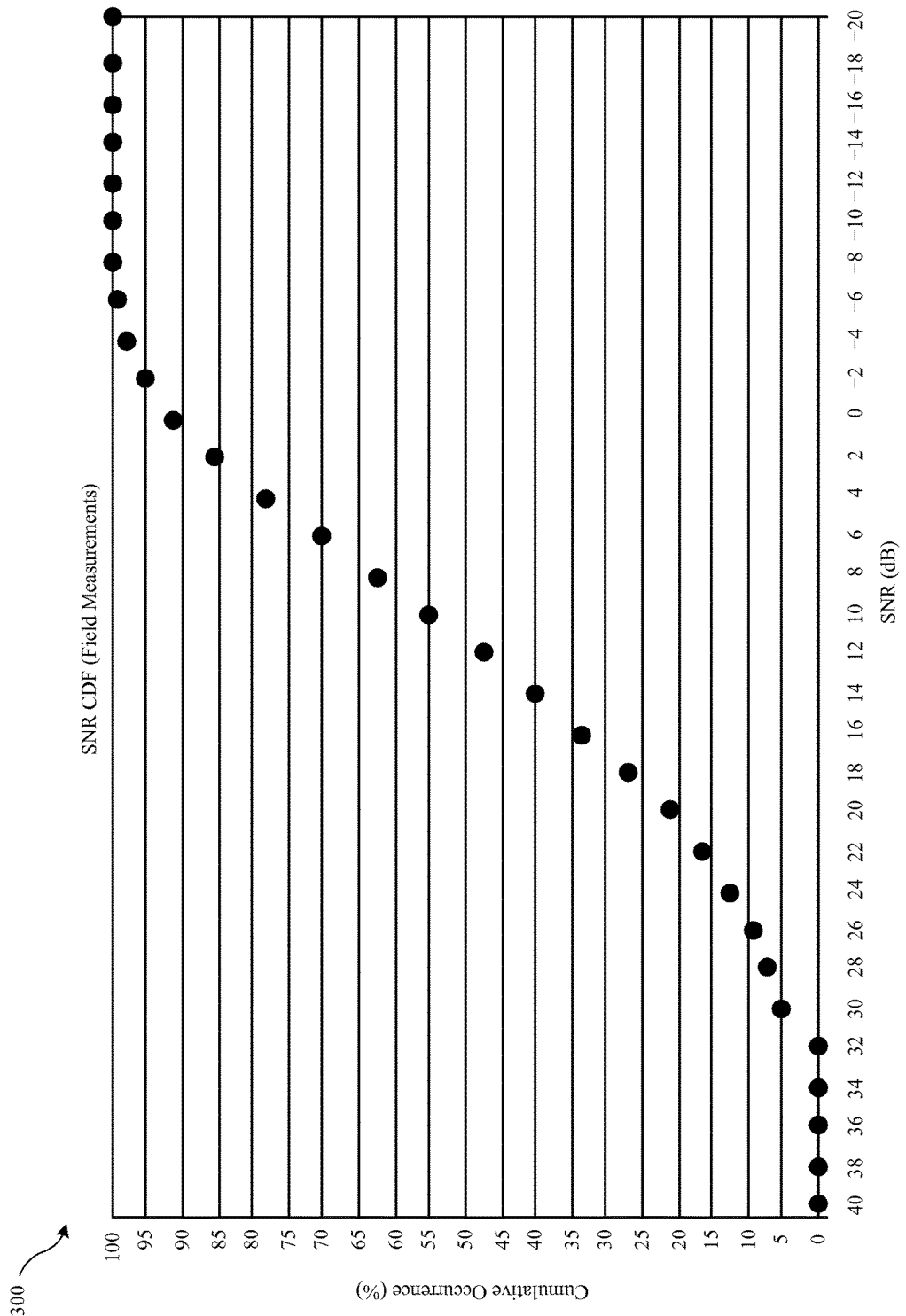
FIG. 3 is a graph plotting signal-to-noise versus a cumulative percentage of occurrence.

FIG. 3 illustrates a graph 300 that plots a measured signal-to-noise ratio versus a cumulative percentage of occurrence in a number of networks. The graph of FIG. 3 illustrates a relationship of a measured signal-to-noise ratio (i.e., a representative signal quality metric) at a wireless communication device to cumulative distribution function (CDF) of the probability of occurrence of the SNR, particularly in an urban environment, for a representative set of field measurements in a number of different wireless networks. Decreasing values of the signal-to-noise ratio are plotted on the X-axis. The graph of FIG. 3 shows that a wireless communication device can measure a relatively low SNR value, e.g. 0 dB or less, in approximately 10% of the measurement occurrences. Unfortunately, interference levels at the wireless communication device are not indicated in signal strength, e.g., RSRP, measurements, and reselection decisions based only on measurements of RSRP can result in a wireless communication device continuing to operate in conditions of low SNR that can cause the wireless communication device to not receive correctly one or more signaling messages, and thus to potentially miss paging messages for establishing a voice connection. As such, some example embodiments provide for reselection on the basis of a measured signal-to-noise ratio that includes measuring interference, noise, and/or signal quality in addition to measuring signal strength at a wireless communication device.

Figure 4:
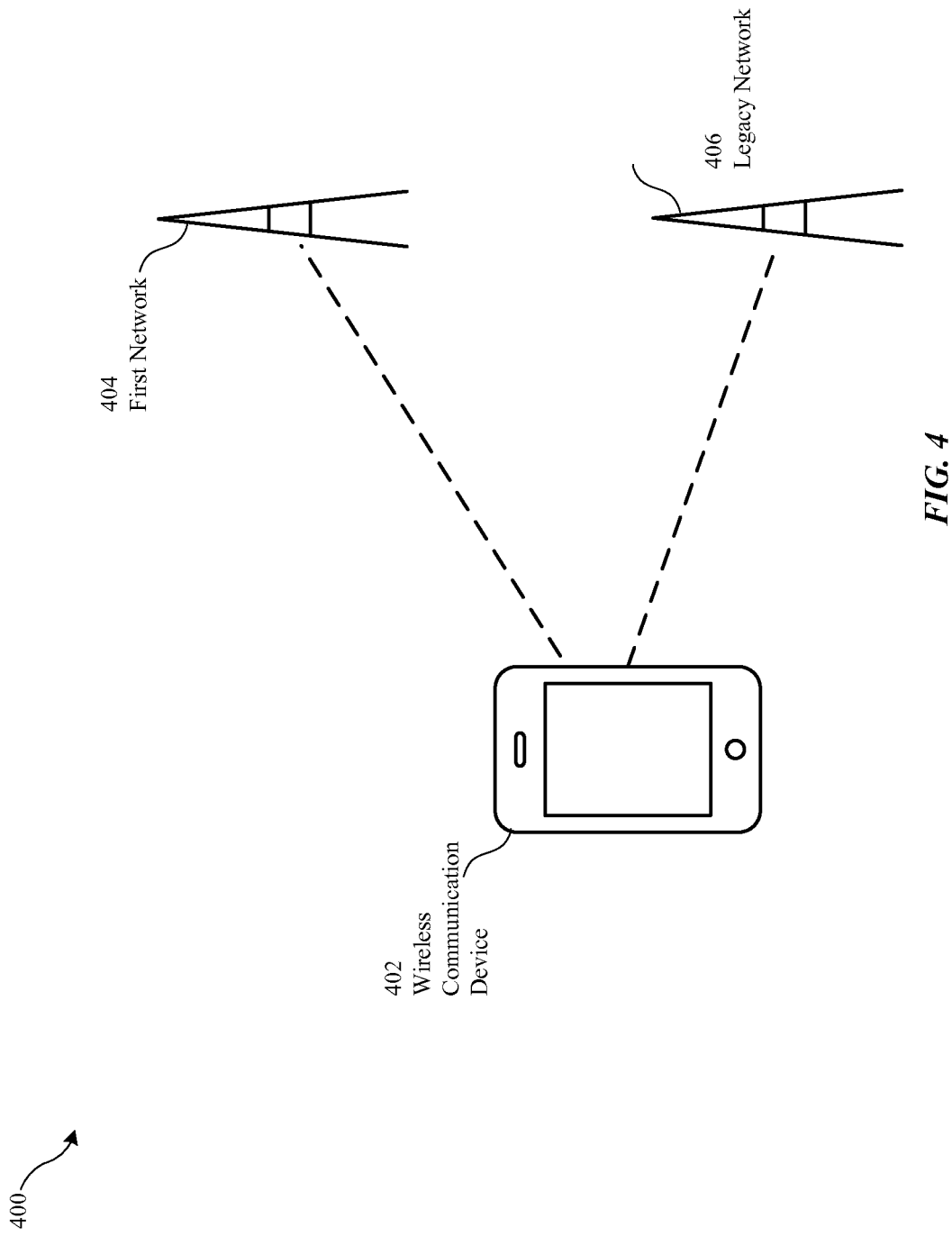
FIG. 4 illustrates an example system having multiple wireless communication networks to which a wireless communication device can connect in accordance with some embodiments.

FIG. 4 illustrates an example wireless network system 400 including multiple wireless communication networks 404/406 to which a wireless communication device 402 can connect in accordance with some example embodiments. By way of non-limiting example, the wireless communication device 402 can be a cellular phone, such as a smart phone device; a tablet computing device; a laptop computing device; or other computing device configured to operate within both a first network 404 and a legacy network 406. In some example embodiments, such as embodiments in which the wireless communication device 402 is configured to connect to a network implementing an LTE standard, the wireless communication device 402 can be embodied as user equipment (UE). The first network 404 can, for example, be a network supporting packet switched (PS) data sessions, offering higher theoretical data rates than the legacy network 406, but not supporting CS voice connections. Thus, for example, the first network 404 can be a network implementing a version of an LTE standard (e.g., an LTE network, LTE-A network, or using another present or future developed LTE standard) or other 4G network, such as the 4G network 102 illustrated in FIG. 1. The legacy network 406 can, for example, be a network that includes a Circuit switched domain to support CS voice connections. By way of non-limiting example, the legacy network 406 can be a UMTS network, a network based on a 3GPP2 wireless communication protocol, or another 3G network. As a further example, the legacy network 406 can be a GSM or other 2G network, or other legacy network that can support CS voice connections. In this regard, the legacy network 406 can be the legacy network 104.

As illustrated in FIG. 4, the wireless communication device 402 can be within signaling range of both a base station or other access network equipment for the first network 404 and a base station or other access network equipment for the legacy network 406. In this regard, the wireless communication device 402 can be located in a region of overlapping coverage of the first network 404 and the legacy network 406. As such, the wireless communication device 402 can be connected to the first network 404, and can reselect to the legacy network 406.

Figure 5:
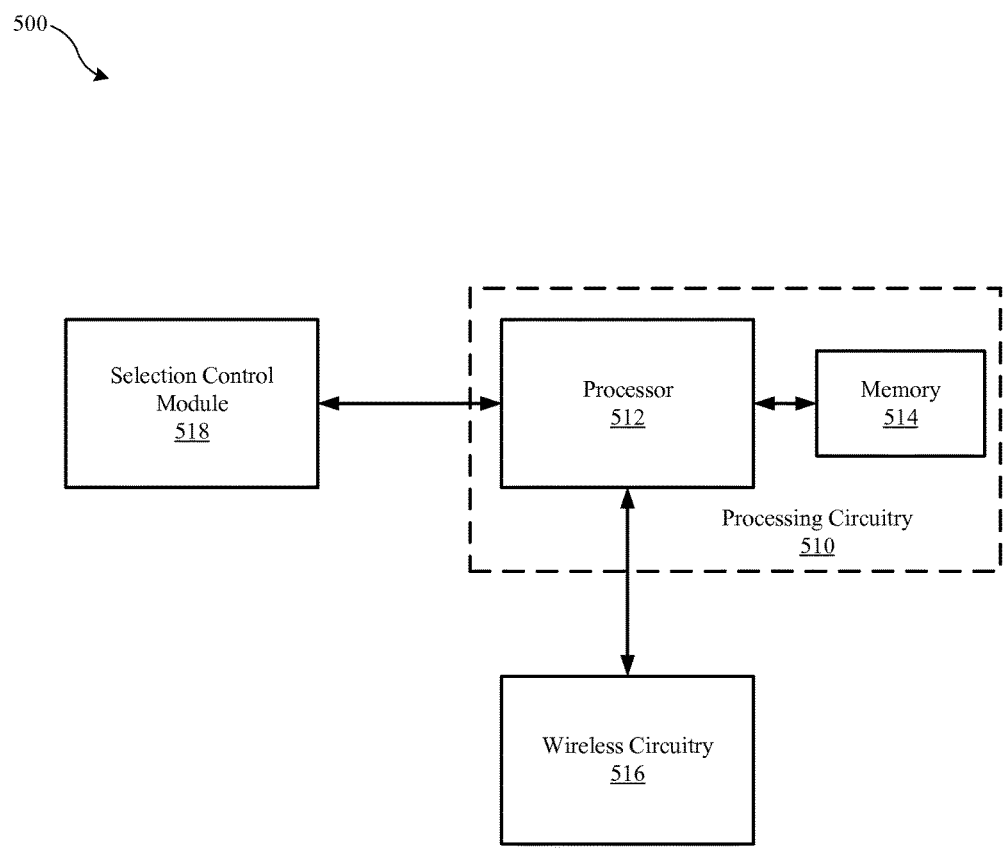
FIG. 5 illustrates a block diagram of an apparatus that can be implemented on a wireless communication device in accordance with some embodiments.

FIG. 5 illustrates a block diagram of an apparatus 500 that can be implemented on a wireless communication device 402 in accordance with some example embodiments. In this regard, when implemented on a computing device, such as wireless communication device 402, apparatus 500 can enable the computing device to operate within the system 400 in accordance with one or more example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of the apparatus 500 in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a chipset including one or more chips. In some example embodiments in which one or more components of the apparatus 500 are embodied as a chipset, the chipset can be capable of enabling a computing device to operate in the system 400 when implemented on or otherwise operably coupled to the computing device. Thus, for example, one or more components of the apparatus 500 can provide a chipset configured to enable a computing device to operate over the first network 404 and/or the legacy network 406.

In some example embodiments, the processing circuitry 510 can include a processor 512 and, in some embodiments, such as that illustrated in FIG. 5, can further include memory 514. The processing circuitry 510 can be in communication with or otherwise control wireless circuitry 516 and/or the selection control module 518.

The processor 512 can be embodied in a variety of forms. For example, the processor 512 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the apparatus 500 as described herein. In some example embodiments, the processor 512 can be configured to execute instructions that can be stored in the memory 514 or that can be otherwise accessible to the processor 512. As such, whether configured by hardware or by a combination of hardware and software, the processor 512 can be capable of performing operations according to various embodiments while configured accordingly.

In some example embodiments, the memory 514 can include one or more memory devices. Memory 514 can include fixed and/or removable memory devices. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. In some embodiments, the memory 514 can be in communication with one or more of the processor 512, wireless circuitry 516, or selection control module 518 via a bus(es) for passing information among components of the apparatus 500.

The apparatus 500 can further include wireless circuitry 516. The wireless circuitry 516 can enable the apparatus 500 to send wireless signals to and receive signals from one or more wireless networks, such as the first network 404 and the legacy network 406. In some embodiments, the wireless circuitry 516 can include components such as: processors and/or specific-purpose DSP circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. As such, the wireless circuitry 516 can be configured to support any type of cellular or other wireless communication technology that may be implemented by the first network 404 and/or legacy network 406. In some example embodiments, the wireless circuitry 516 can be configured to enable the wireless communication device 402 to connect to both the first network 404 and the legacy network 406, e.g., using a "combined" wireless chipset that supports wireless communication protocols for the first network 404 and the legacy network 406. Alternatively, in some example embodiments, the wireless circuitry 516 can include a first wireless communication block configured to enable the wireless communication device 402 to connect to the first network 404 and a second separate wireless communication block configured to enable the wireless communication device 402 to connect to the legacy network 406.

The apparatus 500 can further include selection control module 518. The selection control module 518 can be embodied as various means, such as circuitry, hardware, a computer program product comprising computer readable program instructions stored on a computer readable medium (for example, the memory 514) and executed by a processing device (for example, the processor 512), or some combination thereof. In some embodiments, the processor 512 (or the processing circuitry 510) can include, or otherwise control the selection control module 518.

The selection control module 518 can be configured in some example embodiments to measure characteristics of the first network 404 while the wireless connection device 402 is connected to the first network 404. The measured characteristics can include a measured signal strength of the first network 404. In some example embodiments, such as some embodiments in which the first network 404 implements an LTE standard, the measured signal strength can be a measured RSRP of the first network 404. The measured characteristics can further include a measured signal-to-noise ratio (SNR) of the first network 404. In some example embodiments, the measured SNR can factor in interference and noise, and can be defined as a signal-to-interference-and-noise ratio (SINR). For example, in some embodiments, such as some embodiments in which the first network 404 implements an LTE standard, the measured SNR can be a measured reference signal-SINR (RS-SINR) of the first network 404.

The wireless communication device 402 can be provided with a signal strength threshold value, e.g., based on measurements of a signal sent by the first network 404 and received by the wireless communication device 402, such as an RSRP threshold. The first network 404 can, for example, define the signal strength threshold. In various example embodiments, the signal strength threshold can, by way of non-limiting example, be set by the first network 404 to a value of −104 dBm or a value of −110 dBm (or other similar signal strength measurement values that can correspond to relatively low signal strength in a particular network). If the measured signal strength fails to satisfy a signal strength condition, (e.g., is less than; or less than or equal to), for the signal strength threshold, then reselection by the wireless communication device 402 from the first network 404 to the legacy network 406 can occur.

In accordance with some example embodiments, an SNR threshold can be defined in addition to the signal strength threshold. For example, in embodiments in which an RS-SINR is measured for the first network 404, the SNR threshold can be an SNR threshold. The selection control module 518 can be configured in some example embodiments to compare a measured SNR of the first network 404 to the SNR threshold, and if the measured SNR fails to satisfy the SNR threshold, the selection control module 418 can initiate reselection from the first network 404 to the legacy network 406. For example, if the measured SNR is less than (or less than or equal to, depending on how the threshold is configured) the SNR threshold, the selection control module 518 can be configured to trigger a reselection from the first network 404 to the legacy network 406. Accordingly, even if a measured signal strength of the first network 404 satisfies a signal strength condition based on a measure of a signal strength compared to a signal strength threshold value, reselection from the first network 404 to the legacy network 406 can be performed in interference scenarios on the basis of a measured SNR of the first network 404.

In some example embodiments, the wireless communication device 402 can define the SNR threshold. The SNR threshold can be defined as a value for an SNR at which data, e.g., signaling messages, received from a network, e.g., the first network 404, can be successfully decoded. For example, the SNR can be defined as an SNR at which a paging message, such as for establishing a CS voice connection, can be successfully received and decoded by the wireless communication device 402. By way of non-limiting example, the SNR threshold can be set to a value on the order of −3 dB, in some example embodiments. In some embodiments, the SNR threshold can correspond to a value that triggers a reselection search for a new network and/or cell of a network with which to associate. In some embodiments, a second SNR threshold value (or a range of values) can be used to determine after a portion of the reselection process whether to remain on the first network 404 or reselect to a newly found network, e.g., the legacy network 406. Thus, a first SNR threshold can result in triggering a search for a "better" network, and following an evaluation of available network cells, the wireless communication device 402 can re-check a current value of SNR to determine whether to switch to one of the located network cells.

The SNR threshold can, for example, be a static threshold. In some embodiments, the network can establish a value for the SNR threshold, e.g., through a signaling message. Alternatively, in some example embodiments, the SNR threshold can be adjusted based on historical and/or current operating conditions seen by the wireless communication device 402. For example, in some example embodiments, the SNR threshold can be determined by the selection control module 518 of the wireless communication device 402 based at least in part on historical data that tracks paging messages previously missed by the wireless communication device 402. In this regard, the selection control module 518 can be configured in such example embodiments to gather data regarding missed pages and measurements of SNR (e.g., RS-SINR) over a period of time (e.g., the past hour, day, month, or other period), and can determine an appropriate SNR threshold value on the basis of the measured and/or tracked historical data. In some example embodiments, the SNR threshold can be determined further based on a location of the wireless communication device 402. In this regard, missed pages can be correlated with location information in order to define location-specific thresholds. For example, the selection control module 518 can be configured to determine an approximate and/or an exact location through use of network-provided information, a positioning sensor, such as a Global Positioning System (GPS) sensor, location available from a Wi-Fi connection, a cell identifier, and/or other indication of location, and can associate historical data for successful/failed pages and corresponding SNR with the location. In some such example embodiments, a location can encompass a geographic region.

In some example embodiments, the selection control module 518 can be configured to measure a channel quality of the legacy network 406. The measured channel quality of the legacy network 406 can, for example, include a measure of signal strength, such as a received signal code power (RSCP), of the legacy network 406. Additionally or alternatively, the measured channel quality can include an SNR of the legacy network 406, such as an energy per chip/interference (Ec/Io) of the legacy network 406. The selection control module 518 can be configured, in some such embodiments, to use the measured channel quality of the legacy network 406 to verify that the channel quality of the legacy network 406 satisfies a channel quality threshold prior to reselecting from the first network 404 to the legacy network 406. In this regard, for example, the measured channel quality can be used to ensure that the channel quality of the legacy network 406 is better than that of the first network 404. If the channel quality of the legacy network 406 does not satisfy a channel quality metric, the selection control module 518, in some embodiments, can remain on the first network 404 even when the measured SNR of the first network 404 does not satisfy the SNR threshold.

Figure 6:
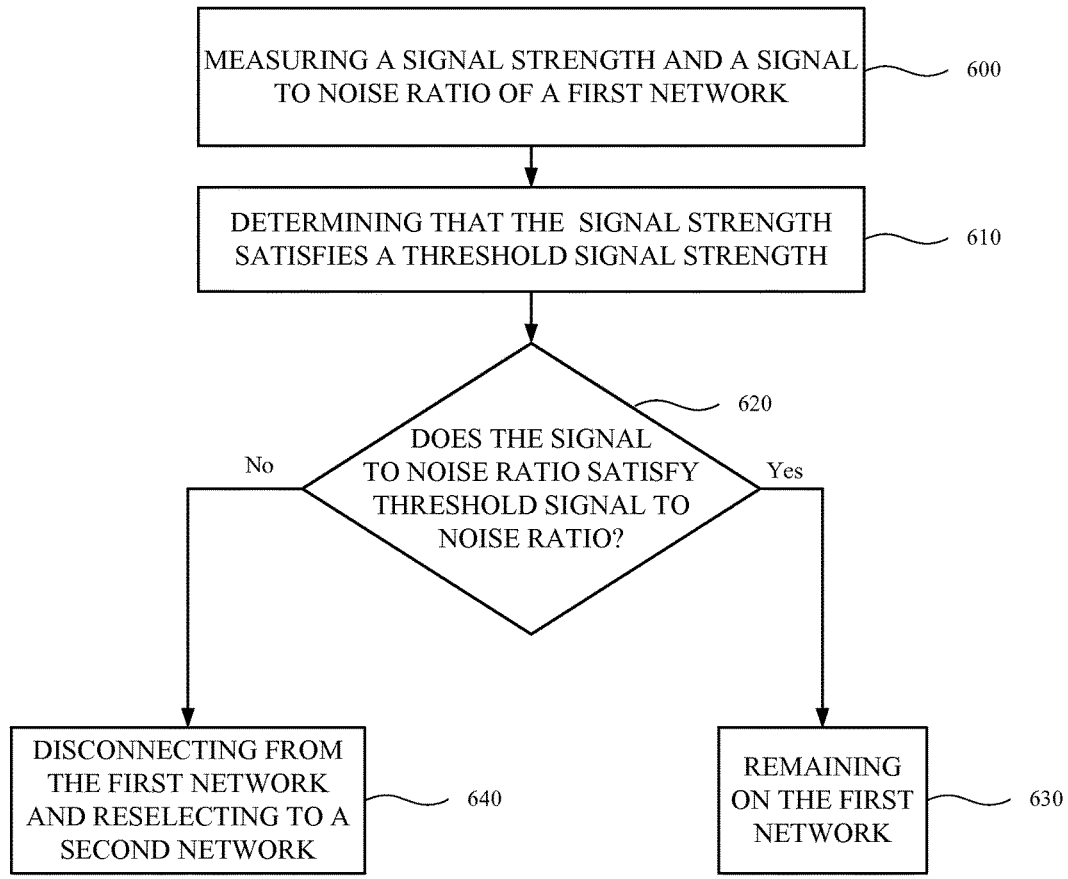
FIG. 6 illustrates a flowchart according to a representative method for network reselection by a wireless communication device based on signal-to-noise ratio in accordance with some embodiments.

FIG. 6 illustrates a flowchart according to an example method for network reselection by a wireless communication device, e.g., the wireless communication device 402, based on signal-to-noise ratio according to some example embodiments. Operation 600 can include measuring a signal strength and an SNR of a first network, such as the first network 404. The measured signal strength can, for example, be a measured RSRP of a serving cell of the first network. The measured SNR can, for example, be a measured SINR, such as an RS-SINR of the service cell of the first network. Operation 610 can include determining that the measured signal strength satisfies a signal strength threshold, e.g., having a measured value that equals or exceeds an RSRP threshold value set by the first network. Operation 620 can include comparing the measured SNR to an SNR threshold and determining whether the measured SNR satisfies the SNR threshold. If it is determined at operation 620 that the measured SNR satisfies the SNR threshold, e.g., a value of a measured signal-to-noise/interference ratio equals or exceeds an RS-SINR threshold value set by the wireless communication device 402, the method can proceed to operation 630, which can include determining to remain on the first network. If, however, it is determined at operation 620 that the measured SNR does not satisfy the SNR threshold, e.g., the measured SNR does not equal or exceeds the RS-SINR threshold value set by the wireless communication device 402, the method can proceed to operation 640, which can include the wireless communication device disconnecting from the first network and reselecting to a second network, such as the legacy network 406. In this regard, the wireless communication device 402 can determine to reselect to the second network and initiate the reselection in response to the measured SNR failing to satisfy the SNR threshold. In some embodiments, the wireless communication device 402 can satisfy a network signal strength condition but can also fail a signal quality (e.g., SNR) condition set by the wireless communication device, and therefore based on poor measured signal quality (despite satisfactory measured signal strength), the mobile wireless communication device 402 can initiate a reselection procedure. One or more of the processing circuitry 510, processor 512, memory 514, transceiver(s) 516, or selection control module 518 can, for example, provide means for performing operations 610-640.

Figure 7:
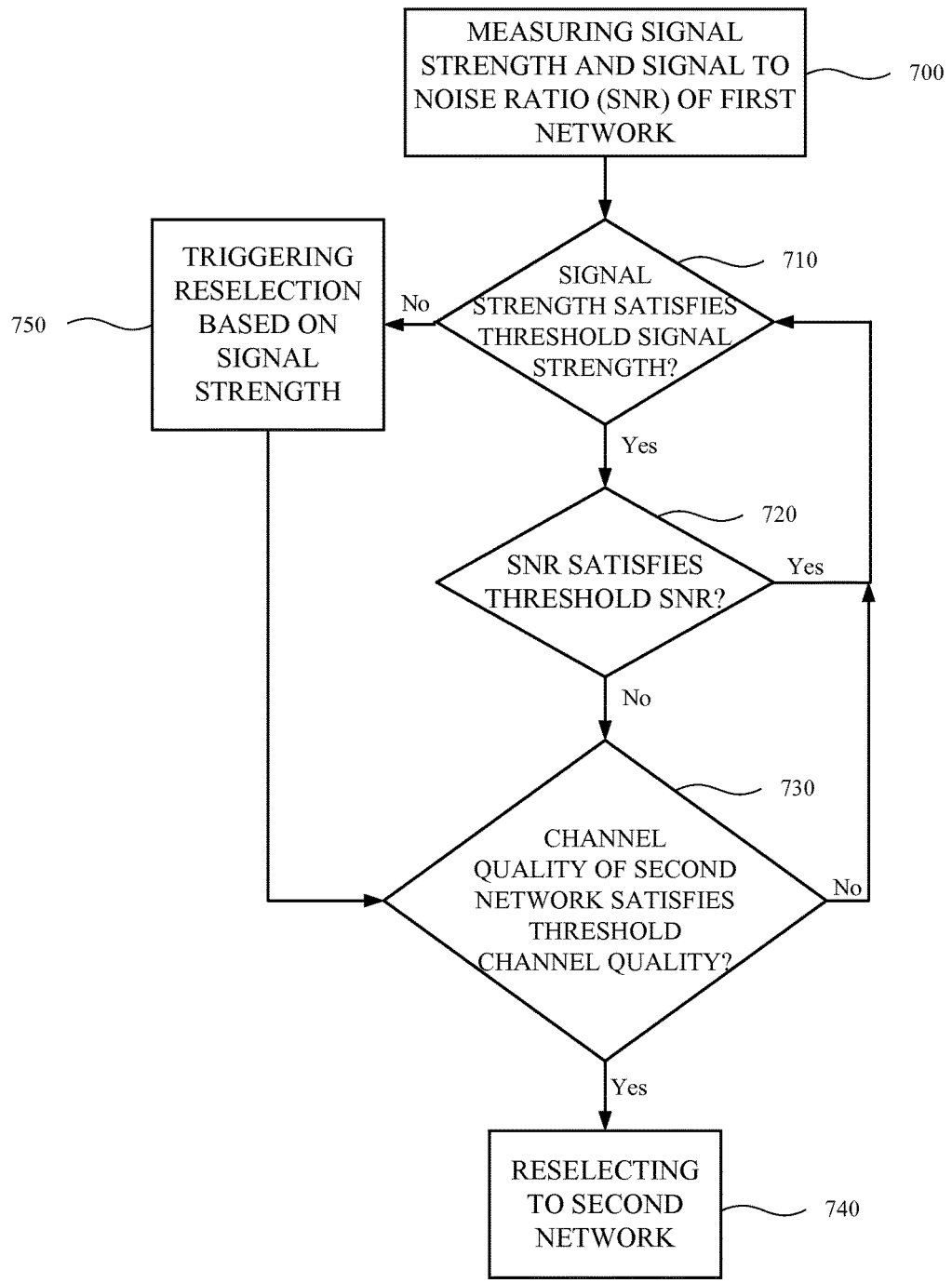
FIG. 7 illustrates a flowchart according to another example method for network reselection by a wireless communication device based on signal-to-noise ratio in accordance with some embodiments.

FIG. 7 illustrates a flowchart according to another example method for network reselection by a wireless communication device, e.g., the wireless communication device 402, based on measurement of a signal-to-noise ratio according to some example embodiments. One or more of the processing circuitry 510, processor 512, memory 514, wireless circuitry 516, or selection control module 518 can, for example, provide means for performing the operations illustrated in and described with respect to FIG. 7. Operation 700 can include measuring a signal strength and an SNR of a first network, such as the first network 404. The measured signal strength can, for example, be a measured RSRP of the first network. The measured SNR can, for example, be a measured SINR, such as an RS-SINR of the first network. Operation 710 can include determining whether the measured signal strength satisfies a signal strength threshold. The signal strength threshold can, for example, be defined by the first network. If it is determined at operation 710 that the measured signal strength satisfies the signal strength threshold, the method can proceed to operation 720, which can include determining whether the measured SNR satisfies an SNR threshold. If it is determined at operation 720 that the measured SNR satisfies the SNR threshold, the method can, for example, return to operation 710 (or alternatively operation 700).

If, however, it is determined at operation 720 that the measured SNR does not satisfy the SNR threshold, the method can proceed to operation 730, which can include determining whether a channel quality of a second network, such as the legacy network 406, satisfies a channel quality threshold. If it is determined at operation 730 that the channel quality of the second network satisfies the channel quality threshold, the method can proceed to operation 740, which can include the wireless communication device 402 reselecting to the second network. Reselecting to the second network can include the wireless communication device 402 disconnecting from the first network and connecting to the second network. In this regard, the wireless communication device 402 can determine to reselect to the second network and initiate the reselection in response to the measured SNR failing to satisfy the SNR threshold.

If, on the other hand, it is determined at operation 730 that the channel quality of the second network does not satisfy the channel quality threshold, the wireless communication device 402 can remain on the first network. The method can, for example, return to operation 710 (or alternatively operation 700).

In an instance in which it is determined at operation 710 that the measured signal strength does not satisfy the signal strength threshold, the method can proceed to operation 750, and operation 720 can be omitted. Operation 750 can include triggering reselection to the second network based on the measured signal strength. The method can accordingly proceed to operation 730 and/or operation 740.

Figure 8:
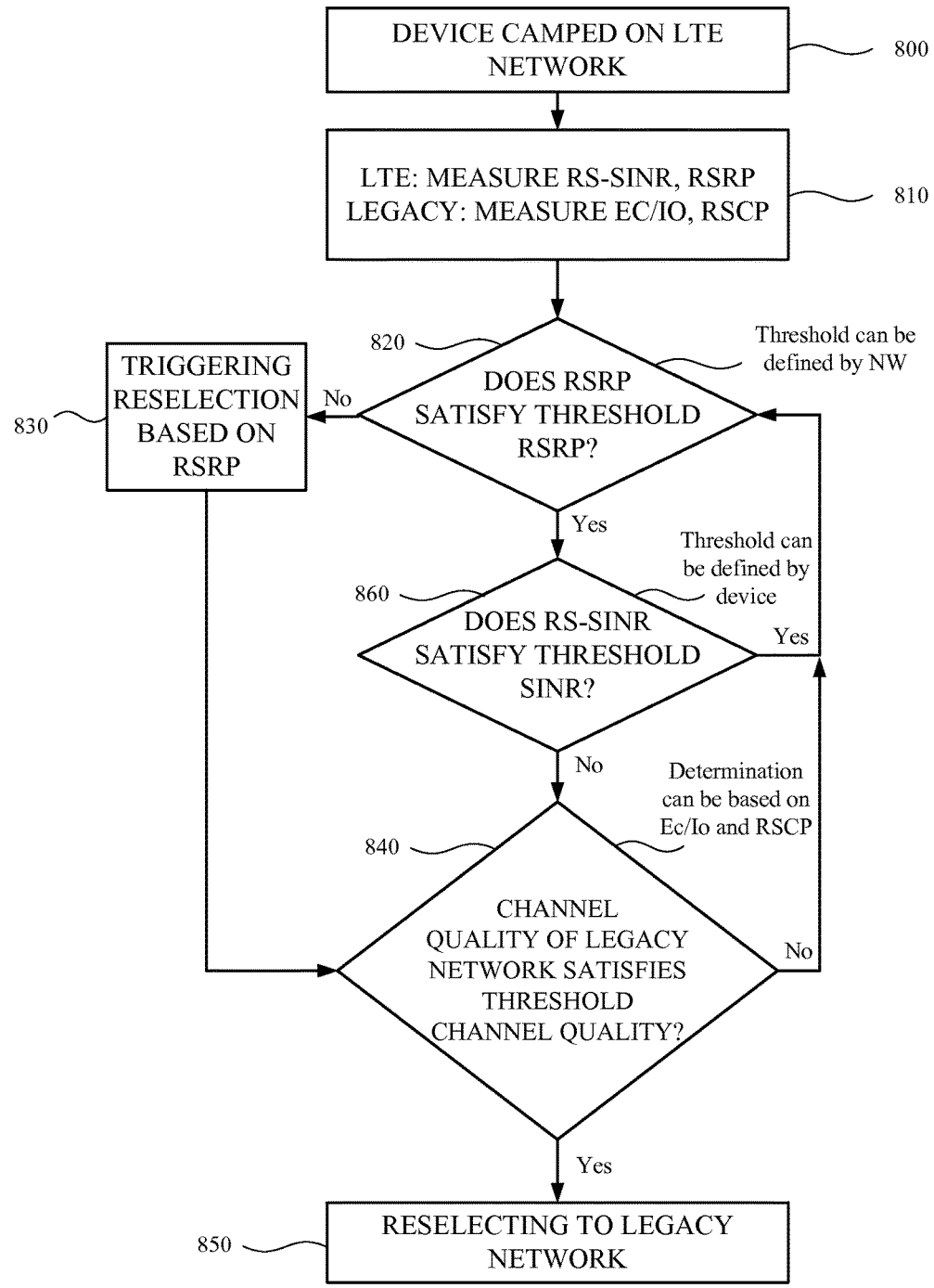
FIG. 8 illustrates a flowchart according to a further example method for network reselection by a wireless communication device based on signal-to-noise ratio in accordance with some embodiments.

FIG. 8 illustrates a flowchart according to a further example method for network reselection by a wireless communication device based on measurement of a signal-to-noise ratio according to some example embodiments. One or more of the processing circuitry 510, processor 512, memory 514, transceiver(s) 516, or selection control module 518 can, for example, provide means for performing the operations illustrated in and described with respect to FIG. 8. The method can begin with operation 800, in which the wireless communication device 402 can be camped on an LTE network. Operation 810 can include measuring an RS-SINR and RSRP of the LTE network. Operation 810 can further include measuring an Echo and RSCP of a legacy network.

Operation 820 can include comparing the measured RSRP to an RSRP threshold to determine if the measured RSRP satisfies the RSRP threshold. The RSRP threshold can be set by the LTE network in some example embodiments. If the measured RSRP does not satisfy the RSRP threshold, the method can proceed to operation 830, which can include triggering a reselection to the legacy network based on the measured RSRP. Operation 840 can include determining whether a channel quality of the legacy network satisfies a channel quality threshold. The determination of operation 840 can, for example, be based on the measured Echo and/or RSCP of the legacy network, such as can be measured at operation 810. The determination of operation 840 can, for example, be performed in accordance with one or more LTE specifications or guidelines, e.g., based on an LTE network reselection quality criterion, and/or based on a legacy network specification, guideline, or other criteria established for reselection from one network to another. If the channel quality of the legacy network is determined to satisfy the channel quality threshold (e.g., good legacy network channel quality), the method can proceed to operation 850, which can include the wireless communication device 402 reselecting to the legacy network. If, however, it is determined that the channel quality of the legacy network does not satisfy the channel quality threshold (e.g., poor legacy network channel quality), the wireless communication device 402 can remain on the LTE network in spite of the measured RSRP not satisfying the RSRP threshold. The method can, for example return to operation 820 (or alternatively operation 810).

If, on the other hand, it is determined at operation 820 that the measured RSRP of the LTE network satisfies the RSRP threshold, the method can proceed to operation 860, which can include determining whether the measured RS-SINR of the LTE network satisfies a RS-SINR threshold. In some example embodiments, the RS-SINR threshold can be defined by the wireless communication device 402. The RS-SINR threshold can, for example, be a static threshold, or can be adjusted based on past and/or current operating conditions seen by the wireless communication device 402. For example, the RS-SINR threshold can be determined based at least in part on historical data regarding missed pages and corresponding RS-SINR. In some example embodiments, the RS-SINR threshold can be determined further based on a location of the wireless communication device 402. In this regard, in some such example embodiments, missed pages can be correlated with location information, such as can be determined from the network, GPS data, location data available through Wi-Fi connections, and/or the like, and one or more location-specific SINR thresholds can be defined.

If the measured RS-SINR does not satisfy the RS-SINR threshold, then the current serving cell may not provide adequate performance, and incoming pages can be missed. As such, if it is determined at operation 860 that the measured RS-SINR does not satisfy the SINR threshold, a reselection process can be triggered by the wireless communication device 402, and the method can proceed to operation 840. If, however, it is determined at operation 860 that the measured RS-SINR does satisfy the SINR threshold, the wireless communication device 402 can remain on the LTE network. The method can, for example return to operation 820 (or alternatively operation 810).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for network reselection by a wireless communication device, the method comprising:
    measuring a downlink signal strength and a downlink signal quality of a first network to which the wireless communication device has an established connection;
    determining whether the downlink signal strength satisfies a downlink signal strength threshold;
    disconnecting from the first network and reselecting to a second network, when the downlink signal strength threshold is not satisfied; and
    when the downlink signal strength satisfies the downlink signal strength threshold:
        determining whether the downlink signal quality satisfies a downlink signal quality threshold, and
        disconnecting from the first network and reselecting to the second network when the downlink signal quality does not satisfy the downlink signal quality threshold.

2. The method of claim 1, wherein the downlink signal strength comprises a reference signal received power (RSRP) and the downlink signal strength threshold comprises an RSRP threshold determined by the first network.

3. The method of claim 1, wherein the downlink signal quality comprises a downlink signal-to-interference-plus-noise-ratio (SINR) and the downlink signal quality threshold comprises a downlink SINR threshold determined by the wireless communication device.

4. The method of claim 3, wherein the downlink SINR threshold comprises an SINR sufficient to enable successful decoding of a paging message received from the first network.

5. The method of claim 3, wherein the downlink SINR threshold is determined based at least in part on historical data of one or more paging messages previously missed by the wireless communication device.

6. The method of claim 5, wherein the downlink SINR threshold is determined further based on a location of the wireless communication device.

7. The method of claim 1, further comprising:
    measuring a signal strength of the second network and a signal quality of the second network before reselecting to the second network; and wherein:
reselecting to the second network comprises reselecting to the second network when the signal strength of the second network satisfies a corresponding signal strength threshold and the signal quality quality of the second network satisfies a corresponding signal quality threshold, and the method further comprises remaining on the first network when the signal strength of the second network does not satisfy the corresponding signal strength threshold or the signal quality of the second network does not satisfy the corresponding signal quality threshold.

8. The method of claim 7, wherein the signal quality of the second network comprises a signal energy to interference ratio (Ec/Io) and the signal strength of the second network comprises a received signal code power (RSCP).

9. The method of claim 7, wherein the corresponding signal strength threshold and the corresponding signal quality threshold comprise thresholds for reselection or handover specified by the first network and/or the second network.

10. The method of claim 1, wherein the first network comprises a Long Term Evolution (LTE) wireless network that operates in accordance with at least one of a version of a Third Generation Partnership Project (3GPP) LTE or LTE-Advanced (LTE-A) wireless communication protocol, and wherein the second network comprises one of a Wideband Code Division Multiple Access (WCDMA) network, a Universal Mobile Telecommunications System (UMTS) network, a Global System for Mobile Communications (GSM) network, or a network operating in accordance with a wireless communication protocol of the Third Generation Partnership Project 2 (3GPP2).

11. A wireless communication device comprising:
wireless circuitry configured to transmit data to and receive data from a first network and a second network; and
processing circuitry coupled to the wireless circuitry, the processing circuitry configured to cause the wireless communication device to:
measure a downlink signal strength and a downlink signal quality of a first network to which the wireless communication device has an established connection;
determine whether the downlink signal strength satisfies a downlink signal strength threshold;
disconnect from the first network and reselect to a second network, when the downlink signal strength threshold is not satisfied; and
when the downlink signal strength satisfies the downlink signal strength threshold:
determine whether the downlink signal quality satisfies a downlink signal quality threshold, and
disconnect from the first network and reselect to the second network when the downlink signal quality does not satisfy the downlink signal quality threshold.

12. The wireless communication device of claim 11, wherein the downlink signal strength comprises a reference signal received power (RSRP) and the downlink signal strength threshold comprises an RSRP threshold determined by the first network.

13. The wireless communication device of claim 11, wherein the downlink signal quality comprises a downlink signal-to-interference-plus-noise-ratio (SINR) and the downlink signal quality threshold comprises a downlink SINR threshold determined by the wireless communication device.

14. The wireless communication device of claim 11, wherein the processing circuitry is further configured to cause the wireless communication device to:
measure a signal strength of the second network and a signal quality of the second network before reselecting to the second network;
remain on the first network when the signal strength of the second network does not satisfy a corresponding signal strength threshold or the signal quality of the second network does not satisfy a corresponding signal quality threshold; and
reselect to the second network when the signal strength of the second network satisfies the corresponding signal strength threshold, the signal quality quality of the second network satisfies the corresponding signal quality threshold, the downlink signal quality of the first network does not satisfy the downlink signal quality threshold, and the downlink signal strength of the first network satisfies the downlink signal strength threshold.

15. The wireless communication device of claim 14, wherein the corresponding signal strength threshold and the corresponding signal quality threshold comprise thresholds for reselection or handover specified by the first network and/or the second network.

16. The wireless communication device of claim 14, wherein the first network comprises a Long Term Evolution (LTE) wireless network and the second network comprises a legacy wireless network.

17. A non-transitory computer-readable medium storing instructions that, when executed by one or more processors of a wireless communication device, cause the wireless communication device to:
measure a downlink signal strength and a downlink signal quality of a first network to which the wireless communication device has an established connection;
determine whether the downlink signal strength satisfies a downlink signal strength threshold;
disconnect from the first network and reselect to a second network, when the downlink signal strength threshold is not satisfied; and
when the downlink signal strength satisfies the downlink signal strength threshold:
determine whether the downlink signal quality satisfies a downlink signal quality threshold, and
disconnect from the first network and reselect to the second network when the downlink signal quality does not satisfy the downlink signal quality threshold.

18. The non-transitory computer-readable medium of claim 17, wherein the instructions, when executed by the one or more processors, further cause the wireless communication device to:
measure a signal strength of the second network and a signal quality of the second network before reselecting to the second network;
remain on the first network when the signal strength of the second network does not satisfy a corresponding signal strength threshold or the signal quality of the second network does not satisfy a corresponding signal quality threshold; and
reselect to the second network when the signal strength of the second network satisfies the corresponding signal strength threshold, the signal quality quality of the second network satisfies the corresponding signal quality threshold, the downlink signal quality of the first network does not satisfy the downlink signal quality threshold, and the downlink signal strength of the first network satisfies the downlink signal strength threshold.

19. The non-transitory computer-readable medium of claim 17, wherein the downlink signal strength threshold is determined by the first network, and the downlink signal quality threshold is determined by the wireless communication device.

20. The non-transitory computer-readable medium of claim 17, wherein the first network comprises a Long Term Evolution (LTE) wireless network and the second network comprises a legacy wireless network.

* * * * *